Patented Oct. 15, 1935

2,017,080

UNITED STATES PATENT OFFICE 2,017,080

MEDICINAL COMPOUND

Wilbur Willis Swingle and Joseph John Pfiffner, Princeton, N. J., assignors to Parke, Davis & Company, Detroit, Mich., a corporation of Michigan No Drawing. Application August 10, 1931, Serial No. 556,298

5 Claims. (Cl. 167—77)

The invention relates to the purification of glandular extracts containing the hormone of the suprarenal cortex.

The main objectionable impurity present in cortical extract is the blood-pressure-raising hormone, epinephrine, which, however, must be rigorously excluded from the extract since it is nonessential in the treatment of patients suffering from Addison's disease and its presence is a contra-indication against intravenous administration of the extract. Moreover, in some patients even small quantities of epinephrine can give rise to alarming side reactions.

We have now invented another method for the separation of epinephrine and certain other impurities from the cortical hormone. This is based upon the fact that the two hormones have been found by us to differ in their acidic properties with the result that they can be separated from each other by means of alkali treatment. The separation has been accomplished in a practical manner in spite of the fact that the cortical hormone can be destroyed by mild saponification treatment with sodium ethylate.

The preferred method for separating the two hormones is to extract the cortical hormone from aqueous solution by means of an immiscible solvent such as benzene or ether, as we have already described in a previously filed application, Serial No. 478,558, filed August 28, 1930. From such organic solvents, which invariably extract considerable amounts of epinephrine in addition to the cortical hormone, the former may be removed substantially completely by treating the immiscible solvent with very dilute aqueous alkali solutions, the cortical hormone remaining in the organic solvent.

One method of carrying out our invention is to use the 70% alcoholic solution of the hormone of the suprarenal cortex obtained in accordance with the directions given in our co-pending application bearing Serial No. 478,558, filed August 28, 1930. In the application referred to the adrenal glands of cattle are first extracted with ethyl alcohol, then treated with benzene to remove proteins, inert material and epinephrine. The benzene is removed from the solution and acetone added to remove phospholipids. The acetone is then removed and the residue treated with petroleum ether and aqueous alcohol to separate neutral fat and cholesterol. The result of this treatment is that the hormone is retained in the 70% alcoholic solution and it is from this point that our improved method of purification is advantageously carried out.

This solution contains 1.58 grams of solids including 27 milligrams of epinephrine. The solvents are removed by distillation in partial vacuo at an external temperature of 45-50° C. Toward the end of the distillation small quantities (about 30 to 50 cc.) of absolute ethyl alcohol are added to facilitate the removal of most of the water. The residue is transferred to a separatory funnel with 100 cc. of ether. The ether solution is washed with several 50 cc. portions of O.1N—NaOH, and then with three 50 cc. washings of distilled water. The alkali and water washings are washed in order with a 100 cc. portion of fresh ether. The ether solution and ether washing are combined, dried over anhydrous sodium sulphate, the ether removed by distillation and the residue taken up in 100 cc. 95 percent alcohol.

Eighty cc. of water are added, the alcohol removed by distillation as usual, the volume brought to 100 cc. and the extract clarified by filtration through a Seitz filter. The finished extract contained only 0.20 gram of solids thus showing that 85 percent of the extractives have been removed. It is a clear pale yellow solution suitable for subcutaneous, intraperitoneal or intravenous use. It is rendered isotonic by the addition of 0.8 percent sodium chloride.

The epinephrine content is approximately one part in five-million, a trace which is negligible.

The separation of epinephrine from the cortical hormone by distributing an active fraction between aqueous alkali and an immiscible solvent can also be carried out earlier in the general process of extraction.

What we claim as our invention is:

1. The method of purifying an extract of the suprarenal cortex which consists in distributing the solution between aqueous alkali sufficiently dilute to prevent destruction of said hormone and an immiscible solvent of the class consisting of benzene and ether, thereby obtaining the active cortical hormone in the immiscible solvent.

2. The method of purifying an extract of the suprarenal cortex which consists in distributing the solution between dilute aqueous alkali and ether, thereby obtaining the active cortical hormone in the ether.

3. The method of obtaining an extract containing the cortical hormone comprising extracting adrenal glands with alcohol, removing the alcohol, treating with benzene to remove proteins, inert material and epinephrine, removing the benzene, treating with acetone to remove phospholipids, removing the acetone, treating the residue with petroleum ether and aqueous alcohol to separate neutral-fat and cholesterol, separating the aqueous alcohol from the ether, removing the aqueous alcohol, and distributing the residue between dilute aqueous alkali and a water immiscible organic solvent of the class consisting of benzene and ether, thereby obtaining the cortical hormone in the immiscible organic solvent, removing the solvent, and forming a water solution thereof.

4. A method of purifying an extract of the suprarenal cortex comprising the distillation of an impure extract containing the cortical hormone epinephrine and other impurities, thereby obtaining a solid residue, dissolving said residue in a water-immiscible organic solvent of the class consisting of benzene and ether, washing the solution with successive portions of dilute aqueous alkali, washing said alkali washings with a water-immiscible organic solvent of the class aforesaid, removing said organic solvent and forming an aqueous solution with the residue from said organic solvent.

5. The process of obtaining an extract containing the cortical hormone substantially free from epinephrine comprising extracting adrenal glands with a solvent for the cortical hormone, removing said solvent leaving a solid residue, dissolving said residue in ether, washing the ether solution with successive portions of dilute aqueous alkali, washing the alkali washings with ether, combining said ether solution and ether washings, removing the ether leaving a solid residue and forming an aqueous solution of said residue.

WILBUR WILLIS SWINGLE.
JOSEPH JOHN PFIFFNER.